United States Patent [19]

Stultz et al.

[11] 4,006,789
[45] Feb. 8, 1977

[54] SCALE FOR WEIGHING HOSPITAL PATIENTS IN THEIR HORIZONTAL POSITION

[75] Inventors: Frederick L. Stultz, Concord; George C. Clark, Oakland, both of Calif.

[73] Assignee: Acme Scale Company, Oakland, Calif.

[22] Filed: Jan. 21, 1976

[21] Appl. No.: 650,823

[52] U.S. Cl. .............................. 177/126; 177/129; 177/253

[51] Int. Cl.² ................. G01G 21/00; G01G 19/00; G01G 21/22

[58] Field of Search .......... 177/126, 129, 140, 145, 177/147, 253, 263

[56] References Cited

UNITED STATES PATENTS

| | | | |
|---|---|---|---|
| 1,728,988 | 9/1929 | Younger et al. | 177/253 X |
| 1,992,262 | 2/1935 | Urp | 177/126 |
| 2,611,604 | 9/1952 | Sutton et al. | 177/126 |
| 3,032,131 | 5/1962 | Schmerl | 177/146 X |

*Primary Examiner*—George H. Miller, Jr.
*Attorney, Agent, or Firm*—Townsend and Townsend

[57] ABSTRACT

A scale which has a frame that is freely movable about the floor defined by a base having forward and aft ends and a pair of spaced-apart upright posts connected to the base and disposed adjacent the aft end thereof. The weighing mechanism includes a carriage that is vertically movable along the posts and which has a pair of horizontal, forwardly projecting arms that support a weigh-board in its horizontal position. The weigh-board is pivotally attached to one of the arms and means is provided for releasably locking the weigh-board in its upright storage position. A guardrail is rigidly secured to the frame and positioned immediately forward of the carriage so that the scale, with the weigh-board in its horizontal position, can be pushed over a hospital bed for transferring a patient onto or from the weigh-board while preventing any contact between any portion of the weighing mechanism and the bed to prevent inaccurate weight measurements.

17 Claims, 4 Drawing Figures

U.S. Patent  Feb. 8, 1977  4,006,789
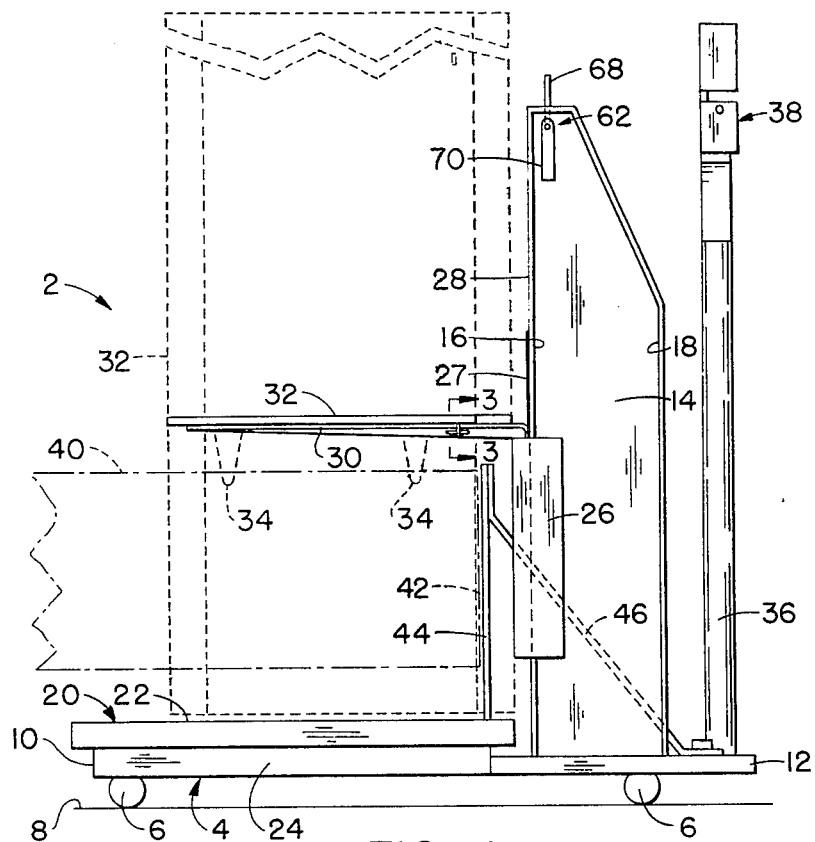
FIG._1.
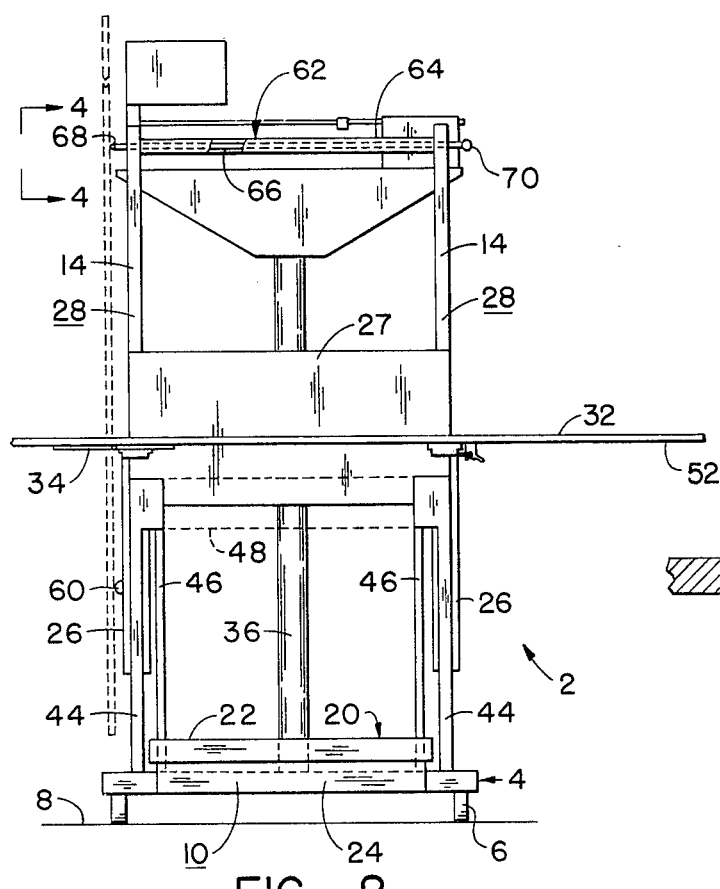
FIG._2.
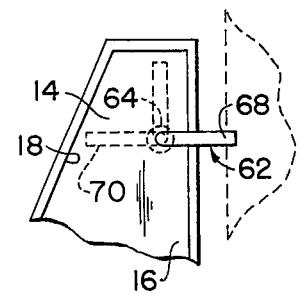
FIG._4.
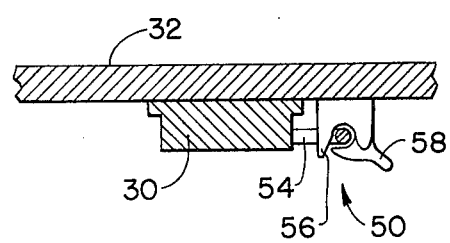
FIG._3.

SCALE FOR WEIGHING HOSPITAL PATIENTS IN THEIR HORIZONTAL POSITION

BACKGROUND OF THE INVENTION

In treating hospitalized patients the body weight and its fluctuations is often of great importance, particularly in cases of actual or impending electrolyte and water imbalance. This determination supplements laboratory data, and makes its interpretation easier, more accurate, more relevant and more meaningful. It provides the clinical observer with objective information which may prove vital for proper and successful treatment of the patient.

In some cases, it is necessary that bedridden patients remain in their lying position. To weigh such patients the scale must be constructed so that the patient can be transferred from the bed onto the scale and weighed while he remains inclined. Such scales generally provide a support structure, usually freely movable over the ground by mounting the structure on casters and a weighing mechanism including a weigh-board carried for supporting the patient in his inclined position during the weighing operation. The weigh-board is sufficiently elevated above ground so that it can be moved over the patient's bed. The support structure includes a base disposed below the weigh-board which is moved beneath the bed while the weigh-board is positioned over the bed. To facilitate the storage of the scale while not in use the weigh-board is normally attached to the weighing mechanism so that it can be placed into an upright storage position. A scale of this type is disclosed in U.S. Pat. No. 3,032,131.

There are other prior art scales for weighing patients in their horizontal position which structurally differ from the one disclosed in the referenced patent. However, all scales have the general characteristic of providing a horizontal weigh-board, a movable support frame over the bed for receiving the patient while providing a sturdy and stable support for the weigh-board.

Prior art scales for weighing patients in their horizontal position generally enable accurate measurements and they are relatively convenient for transferring the patient from the bed to the scale and back. However, they have a number of practical deficiencies which can render such scales cumbersome to handle and which may impair their accuracy unless the attendant carefully isolates the scale, and particularly the components of the weighing mechanism, from coming into contact with objects such as the side of the patient's bed, for example. If such contact does occur the measured weight is of course inaccurate. This is particularly serious because such inaccuracies cannot be detected after the measurement has been taken and the scales provide no means of warning the attendant that the weight he measures is inaccurate because the weighing mechanism is in contact with a foreign object, e.g., the bed.

In addition, prior art scales of the type under consideration have certain features which make them cumbersome to operate. For example, the weigh-board is normally pivotally mounted to a portion of the weighing mechanism so that it can be moved between an operative, horizontal position and a vertical storage position. To prevent the accidental movement of the board from one or the other position, it must be locked. Complicated locking arrangements for retaining the board in its upright storage position required careful operation of the locking mechanism on the part of the attendant. It was frequently necessary that the attendant walk around the scale to the point at which the lock can be applied. This is both cumbersome and time-consuming. An inattentive or careless attendant may forego the locking of the board altogether. While unlocked, however, the board may be accidentally tipped and pivoted into a horizontal position which is undesirable at least and which can injure bystanders or cause standing objects to be knocked down and damaged.

Accordingly, prior art scales for weighing bedridden patients in their horizontal position, while they were adequate when properly operated, had several features which could compromise their accuracy and/or their safety.

SUMMARY OF THE INVENTION

The present invention is broadly directed to improving prior art scales for weighing bedridden patients in their horizontal position to enhance the accuracy, safety and convenience of such scales.

In general terms, the scale has a frame defined by a substantially horizontal base and a pair of spaced-apart, upright posts positioned at an aft end of the base. Means such as casters is provided for moving the frame in a horizontal direction. An upright guardrail is positioned forward of and spaced from each post and has a lower end rigidly secured to the frame. A brace connects the upper end of the guardrail with the frame to prevent deflections of the rail when a horizontal force is applied to its upper end. A weighing mechanism of the scale includes a carriage that is vertically movable along the posts and positioned in a space between the guardrails and the posts. The carriage includes a pair of spaced-apart, horizontally disposed arms which project from adjacent the posts towards the forward end of the base. A weigh-board is pivotally secured to one of the arms for movement between a horizontal position in which both arms support the weigh-board and an upright storage position.

The scale includes means preventing pivotal movements of the weigh-board past its vertical storage position. Additionally, an elongate, generally horizontally oriented lever is axially journaled in the post and has an end disposed in close proximity to the board when the board is in its vertical storage position. The end of the lever adjacent the board includes a perpendicularly extending protrusion of a sufficient length so that the protrusion can engage a side of the board facing the horizontal arms. Means is further provided for pivoting the lever about its axis for engaging and disengaging the protrusion and board to thereby lock the board in its storage position or release it.

The provision of the guardrails forward of the vertically movable carriage shields the carriage and therewith the otherwise accessible components of the weighing mechanism from contact with the side of the bed when the scale is wheeled against the patient's bed. The attendant need not pay attention to clear the weighing mechanism from contact with the bed side and need not be concerned with the possibility that during the weighing operation the scale might move towards the bed so that contact between the bed and the weighing mechanism would interfere with the accurate weighing process. Instead, the present invention positively prevents such contact and resulting inaccuracies in the measured weight. Thus, the attendant can concentrate on the weighing process without having to observe the patient's safety and comfort, and adjust the relative position of the bed or the scale.

In addition, the provision of a horizontally extending actuating lever for retaining the board in its vertical storage position is within easy reach of either side of the scale. Thus, the operator can lock the board in its storage position without having to walk around the scale as was necessary in the past. The attendant's compliance with his instructions to lock the board in its storage position is thereby more readily obtained.

While constituting substantial improvements to the operating characteristics and the weighing accuracy of scales for bedridden patients, the present invention adds little to the costs of such scales as compared to the costs of prior art scales. Thus, the benefits of the present invention are within easy economic reach of the user of such scales. A widespread improvement of patient treatment, safety and handling when weighing bedridden patients is thus assured.

BRIEF DESCRIPTION OF THE DRAWINGS

FIG. 1 is a side elevational view of a scale constructed in accordance with the present invention;

FIG. 2 is a front elevational view of the scale shown in FIG. 1;

FIG. 3 is a fragmentary, enlarged cross-sectional view and is taken on line 3—3 of FIG. 1; and FIG. 4 is an enlarged, fragmentary side elevational view and is taken on line 4—4 of FIG. 2.

DESCRIPTION OF THE PREFERRED EMBODIMENTS

Referring to the drawings, a scale 2 constructed in accordance with the present invention for weighing bedridden patients in a horizontal inclination generally comprises a supporting frame 4 including a base 24 which mounts casters 6 for freely rolling the scale about a horizontal support surface such as a hospital floor 8. The frame has a forward end 10 and an aft end 12 and includes a pair of spaced-apart, upright posts 14 which have a generally U-shaped cross-section defined by relatively short side flanges 16, 18. The posts project upwardly from the base adjacent the aft end thereof.

Mounted to base 24 is a weighing mechanism 20 which includes a horizontal weighing platform 22 disposed above the base 24. The weighing mechanism further includes spaced-apart carriages 26 which are vertically movable along front face 28 of posts 14 via a suitable carriage lifting mechanism (not shown in the drawing but illustrated in the above-referenced U.S. patent) and a pair of forwardly extending, spaced-apart horizontal arms 30 mounted to the carriages and protruding from adjacent the upright posts towards the forward end 10 of frame 4. The carriages are interconnected by a shield 27.

A weigh-board 32 is secured to one of the arms, say the lefthand arm (as seen in FIG. 2) with hinges 34 for pivotal movement of the board about a generally horizontal pivot axis (which is parallel to the arms) between a horizontal operative position and a vertical storage position. The latter position is shown in phantom lines in FIGS. 1 and 2. The weighing mechanism further includes the conventional weighing beam, poises, sight indicators, etc. mounted to an upright support 36 and collectively identified in the drawings with reference numeral 38.

The scale is used as follows. During non-use the weigh-board 32 remains in its vertical storage position to reduce the required storage space and prevent the board from interfering with normal hospital traffic. For use the attendant pivots the board into its horizontal position and raises it sufficiently (by raising carriages 26 along upright posts 14) so that the weigh-board and the supporting horizontal arms 30 are slightly above the upper surface of a bed 40. The scale is now pushed forward to place the weigh-board over the bed until a side 42 of the bed is closely adjacent carriages 26. The patient is then transferred from the bed onto the weigh-board by rolling and/or sliding him onto the weigh-board. Thereafter the weighing operation is performed and upon its completion the patient is transferred from the weigh-board to the bed by reversing the above-described steps.

Since carriages 26 and their interconnecting shield 27 form part of the weighing mechanism any contact between an outside object, such as bed 40, and the carriages would render the weight measurement inaccurate. It is, therefore, necessary to maintain a positive spacing between the carriages and bedside 42. For that purpose the present invention positions an upright guardrail 44 immediately forward of the carriage. The lower end of the guardrail is rigidly secured to frame 4. To enable the positioning of the scale as closely adjacent the bed as possible it is preferred that the guardrail be constructed of a bar having a rectangular cross-section with the thickness of the bar extending parallel to horizontal weigh-board supporting arms 30. In this manner the bar takes up minimum space. To prevent such a guardrail from being deflected when the scale is pushed against the bedside, for example, an inclined brace 46 is provided for each rail. The brace has a first end connected to the upper end of the guardrail 44 while the other, lower end is connected, e.g., bolted to the aft end 12 of support frame 4. In this manner, both guardrails provide a rigid protection for the weighing mechanism in general and carriages 26 in particular, so that even if the scale is pushed against the bedside 42 the measurement remains accurate because no physical contact between the bed and the weighing mechanism is possible. For particular applications it might be desirable to include a horizontal connecting plate 48 (shown in phantom lines in FIG. 2 only) between the upper ends of guardrails 44.

To assure that the weigh-board remains in its horizontal position during the weighing operation a latch 50 is mounted to a side 52 of the weigh-board facing horizontal arms 30. The horizontal arm 30 opposite from the arm connected to hinges 34 includes a catch such as a metal loop 54 positioned to engage a hook 56 of the latch. To return the weigh-board to its vertical storage position the attendant retracts a release lever 58 of hook 56 to disengage the hook from the catch.

To prevent the weigh-board from being pivoted past its vertical position a stop 60 is secured to the carriage 26 which is adjacent the board when the latter is in its storage position. The stop may be mounted to a suitable support bracket (not shown in the drawings) and it is preferably constructed of a resilient material to prevent it from scratching or otherwise damaging the board.

The present invention further provides a locking mechanism 62 for releasably retaining the board in its vertical storage position. The locking mechanism comprises a horizontally disposed tube 64 disposed between and connected to posts 14. An elongate bar or lever 66 is rotatable in the tube and has ends projecting therefrom. A protrusion 68 extends perpendicular to the lever and is positioned to engage side 52 of weigh-board 32 as is best seen in FIG. 4. The opposite end of the lever is fitted with a perpendicularly protruding handle 70 which enables pivotal movements of the lever and therewith of protrusion 68 between a first, board engaging and locking position and a second, board releasing position (shown in phantom lines in FIG. 4). To facilitate the ease with which the locking mechanism 62 is operated, a second handle (not shown in the drawings) may be mounted to the end of lever 66 from which protrusion 68 extends. In this manner, the attendant can lock or release the weigh-board from either side of the scale.

What is claimed is:

1. A scale for weighing a patient in the horizontal position comprising: a support frame; a weighing mechanism carried by the support frame including a generally horizontally protruding member connected to the weighing mechanism; a weigh-board; means connecting the weigh-board to the horizontal member for pivotal movement of the board about a horizontal axis between a first, horizontal position and a second, vertical storage position; means for retaining the weigh-board in the vertical position including stop means positioned to engage a portion of the weigh-board for preventing pivotal movement of the weigh-board about said horizontal axis past its vertical position, said stop means comprising a locking member defined by a protrusion and means for selectively moving the protrusion into and out of engagement with the weigh-board when the weigh-board is in its vertical position to thereby selectively lock the weigh-board in its storage position while the board is not in use.

2. A scale according to claim 1 wherein the means for moving the protrusion comprises an elongate bar connected with and disposed substantially perpendicular to the protrusion, and means journaling the bar so that the protrusion can be pivotally moved into and out of engagement of the weigh-board.

3. A scale according to claim 2 wherein the frame includes a pair of upwardly extending, spaced-apart posts, the posts being closely adjacent but laterally spaced from the board, and wherein the journaling means comprises bearing means carried by the posts.

4. A scale according to claim 3 including handle means perpendicularly extending from an end of the bar opposite the end from which the protrusion extends for pivoting the bar and the protrusion into weigh-board engaging and disengaging positions.

5. A scale for weighing a patient in the horizontal position comprising in combination:
a frame including an upright support post;
a weighing mechanism carried by the frame, the weighing mechanism including a carriage vertically movable along the post and at least one member connected with the carriage and protruding horizontally from the carriage;
a flat board supported by the member for receiving the patient in the horizontal position and means disposed on a first side of the member connecting the board to the member for pivotal movements about a horizontal axis generally parallel to the member so that the board can be pivoted from a horizontal, operative position into a vertical, storage position; and
an elongate generally horizontally oriented bar journaled in the post and having an end disposed in close proximity to the board when the board is in its vertical storage position, the bar including a protrusion disposed at said end extending perpendicular to the bar and being of a sufficient length so that the protrusion can engage a side of the board facing the horizontal member, and means for pivoting the bar about its axis for engaging and disengaging the protrusion from said board side to thereby lock the board in its storage position or release it.

6. Apparatus according to claim 5 wherein the pivoting means for the bar comprises handle means disposed and connected to another end of the bar and extending generally perpendicularly from the bar.

7. Apparatus according to claim 6 wherein the bar has a generally Z-shaped configuration, ends of the bar defining the protrusion and the handle means, respectively.

8. A scale for weighing a patient in his horizontal position comprising: a support frame including an upright post and means for moving the frame over the ground and against a bed of the patient so that the post is closely adjacent a side of the bed; a weighing mechanism carried by the frame including a flat weigh-board and means positioning the weigh-board so that it extends horizontally away from the post at a point sufficiently elevated to place the weigh-board over the bed when the post is closely adjacent the bed side; and guard means rigidly connected with the frame, disposed beneath the board and preventing the bed side from contacting any part of the weighing mechanism when the post is closely adjacent the bed side and the board is positioned above the bed.

9. Apparatus according to claim 8 wherein the weighing mechanism includes a carriage vertically movable along the post, and wherein the guard means comprises an upright rail positioned on the side of the carriage opposite from the post and preventing contact between the bed side and the carriage when the bed object is disposed between the ground and the horizontal weigh-board.

10. A scale according to claim 9 wherein the rail is constructed of a relatively flat bar having a width substantially greater than its thickness, and wherein the bar is positioned so that its relatively wider side faces the bed side to enable the post to be positioned relatively closely adjacent to the bed side.

11. A scale according to claim 9 wherein a lower end of the rail is secured to the frame, and including a brace connecting an upper end of the flat bar with the frame to prevent deflections of the upper end when subjected to a horizontal force acting on the relatively wide side of the bar.

12. A scale for weighing a patient in the horizontal position comprising:
a supporting frame including a horizontal base having a forward end and an aft end and lateral sides, an upright post connected to the base and positioned adjacent the aft end and means permitting the frame to be moved about a supporting surface;
a weighing mechanism including a carriage vertically movable along the post and facing towards the forward end of the base, a horizontally disposed weigh-board connected with the carriage at a point spaced above the base and on the side of the post facing the forward end of the base, and means for determining the weight placed on the weigh-board;

whereby a generally horizontal object spaced from the surface can enter the space between the weigh-board and the base;

guard means for shielding the carriage and parts connected therewith from being contacted by said object, the guard means comprising a pair of upright bars having their lower ends immovably secured to the frame, and a brace connecting upper ends of the bars with the frame for stiffening free upper ends, the upright bars being positioned forward of the carriage so that the bars intercept the object before the object can contact the carriage and influence the measured weight.

13. A scale according to claim 12 including a pair of spaced-apart upright posts, wherein the carriage comprises first and second interconnected carriage portions movable along the posts, wherein each bar is in substantial alignment with and immediately forward of said carriage portions, and wherein the brace comprises an angularly inclined brace having a first end connected to the upper end of the respective bar and a second end connected with the base.

14. A scale according to claim 12 including a pair of horizontal members connected to and movable with the carriage and projecting therefrom in the direction towards the forward end of the base, and including means connecting the weigh-board to one of the horizontal members for pivotal movement of the weigh-board about a horizontal axis between an operative, horizontal position and a vertical storage position.

15. A scale according to claim 14 including means for releasably locking the weigh-board in its vertical storage position, the locking means comprising: an L-shaped, elongate bar having perpendicular, interconnected major and minor legs; means mounting the major leg in a generally horizontal orientation to the posts for pivotal movement about the axis of the major leg, the mounting means positioning the L-shaped bar so that the minor leg can be pivoted between a first position in which the minor leg contacts a side of the weigh-board facing the horizontal member and a second position in which the minor leg is out of contact with the weigh-board for locking the weigh-board in the vertical position and releasing it for pivotal movement into its horizontal position, respectively; and means connected with the major leg for manually rotating the L-shaped bar between the two positions.

16. A scale according to claim 15 including means preventing the pivotal movement of the weigh-board from its horizontal position past its vertical position.

17. A hospital scale for weighing patients in a horizontal position, the scale permitting the transfer of a laying patient from a bed onto the scale comprising in combination:

a frame defined by a substantially horizontal base and a pair of spaced-apart, upright posts positioned at an aft end of the base and means for moving the frame in a generally horizontal direction;

an upright bar positioned forward of and spaced from each post, a lower end of each bar being rigidly secured to the frame, and a brace rigidly connecting an upper end of each bar with the frame;

a weighing mechanism including a carriage vertically movable along the posts, the carriage being positioned in a space between the upright bars and the posts, the carriage further including a pair of spaced-apart, horizontally disposed arms projecting from adjacent the posts towards a forward end of the base;

a weigh-board pivotally secured to one of the arms for movement between a horizontal position in which both arms support the weigh-board and an upright storage position;

means preventing pivotal movements of the weigh-board past the vertical storage position; and an L-shaped lever mounted to the posts for pivotal movement about a generally horizontal axis which is transverse to a pivot axis of the weigh-board, the lever including a relatively shorter leg positioned to engage the weigh-board when it is in its storage position to prevent pivotal movement of the weigh-board into its horizontal position while so engaged, and handle means for pivoting the lever to move the shorter leg of the lever between its weigh-board locking position and another position in which the lever releases the weigh-board.

* * * * *